Patented Feb. 18, 1930

1,747,906

UNITED STATES PATENT OFFICE

LAWRENCE J. OLLESHEIMER, OF WEST ORANGE, NEW JERSEY, ASSIGNOR TO SPRUCO-LITE CORPORATION, INC., OF WEST ORANGE, NEW JERSEY, A CORPORATION OF NEW JERSEY

COMPRESSED LAMINATED PRODUCT AND PROCESS OF MAKING THE SAME

No Drawing. Application filed October 28, 1927. Serial No. 229,521.

This invention relates to compressed composite products of laminated material having a fibrous structure and to process for producing such products. The object of the invention is to render such products stable with respect to varying conditions of temperature and humidity of the environment in which the product is made, used, or through which it may be transported.

Heretofore (cf. Patent No. 1,465,383 of August 21, 1923) composite products have been made by compressing under great pressure, a stack or pile of layers of material, such as lumber, having a binder interposed between adjacent layers. By maintaining the stack of material under pressure until the binder has set, a dense composite block was produced. Such a block was then cut into appropriate pieces which were fabricated in different ways to make various products, such as pulleys, gears, and the like. These products it was observed under some conditions exhibited signs of distortion and tended to render them not entirely satisfactory for their intended use. The cause of such distortion was not readily detectable. Numerous efforts to remedy the condition proved futile.

I have now discovered that the cause of the distorting effects developed in the material is to be found in excessive variations of the moisture content of the product such as occur when said product is made in the usual manner. Such products when shipped to warm or dry climates exhibit a greater tendency toward auto-distortion than when used in the locality where the product is manufactured. The resultant evaporation of moisture which takes place in a drier or a warmer environment is apparently a more powerful or energetic agent causing distortion than the absorption of moisture when the product is used in a more humid environment. These facts led me to modify the method heretofore employed in the particulars hereinafter referred to.

In accordance with my improved procedure I can impart great stability and enhanced utility to the final product by drying the raw material, such as wood, to a sub-normal degree at an introductory stage of the process of manufacturing the final product. By thus controlling the moisture content of the wood and preferably by adjusting the moisture content so that it is not greater than that which is required for the stability of the product, a final product is obtained which can be used in or shipped through or to relatively dry or hot environments without developing deleterious deterioration and also developing no deleterious deterioration when used in a more humid environment than that prevailing at the place of manufacture.

Generally speaking, my invention contemplates controlling the moisture content of raw or intermediate material at some stage prior to fabrication into the finished product so that the moisture content of the finished product is lower than that of the environment where such product is to be used or shipped. The moisture control is preferably exercised at an introductory stage of the process, and I have found it to be especially advantageous to dry material, such as wood, prior to the addition of the binder substance. After the wood, or the like, is sub-normally dried and is impregnated, coated, or covered with the binder, it is piled in layers in the usual manner to form a stack of material in which the grain of some or all of the adjacent layers extends at differing angles. This stack of layers is then subjected to the customary pressure operation which compresses the stack to a fractional portion of its original volume or height. When the binder between the various layers of the stack has set, the block of compressed composite product is fabricated in any manner suitable or appropriate to the production of the desired final product.

The following specific example of a preferred mode of carrying my invention into practice is given for illustrative purposes and for a better understanding of the invention.

A selection of a material having a fibrous structure, such as wood, like spruce, is first made by giving due consideration to the characteristics and properties required in the final product. The selected spruce wood is prepared in any suitable way and is usually cut into boards or strips having dimensions appropriate to the product to be fabricated. When articles such as pulleys, gears, and the like are to be manufactured, the boards are approximately four feet long, about four to twelve inches wide, and a fraction of an inch thick, although other dimensions may be selected depending on the particular conditions and circumstances, as one skilled in the art will readily understand. The moisture content of the wood varies within wide limits but the usual commercial air or kiln dried wood contains approximately ten to twenty-five percent moisture.

Such so-called dry wood is, for the purposes of this invention, to be regarded as being wet wood. By now drying this wet wood to a subnormal degree in any approved manner, a truly dried wood is obtained which is almost bone dry or contains up to say about two percent of moisture. In carrying out this drying operation care must be taken to keep the grain and the pores of the wood open for free absorption of a binder and not to case-harden the wood because a wood having a case-hardened surface greatly impedes or even prevents the subsequently necessary absorption of a binder. Proper drying under observance of the foregoing conditions can be carried out in any standard drying apparatus adapted for adequate control of heat and humidity during the dry operation.

In applying a binder to the spruce boards drier to a sub-normal degree both the mode of application and the type of binder may be varied to meet the specific circumstances. Organic as well as inorganic binders dissolved in either an organic solvent or an aqueous solvent may be employed to coat, cover, impregnate, saturate, etc., the dried boards. Whichever bonding composition is employed, it should be mobile at ordinary working temperatures and pressures as contrasted with immobile bonding agents such as powdered glue, solid resins, or sheet rubber or similar immobile substances. Bonding composition in the mobile or fluid state will readily enter and be drawn into the pores of the wood when applied at ordinary temperatures and pressures so as to accumulate, within the structure of the wood, a substance imported by the bonding composition which may serve as a lubricant for the fibres during the period when the fibres move upon themselves during subsequently applied enormous pressure. One method is to cover the superficial surfaces of the board in any well known coating machine with a casein type glue or with a binder containing casein, lime, sodium silicate, and a metallic salt dissolved in water in appropriate proportions. A large variety of casein glues may be used but a casein glue made in accordance with one of the formulæ of the Forest Products Laboratory has been found to give satisfactory results. Whatever variety of casein glue is used, it is preferable to apply it to the wood while the glue is still in the freshly prepared state. When a casein binder of the aforesaid casein type is applied to the subnormally dried spruce boards, the moisture content of the latter increases, but only to the extent of say approximately six to ten percent which is, however, lower than the highest permissible degree of moisture content required for stability in the final product.

The glue-coated boards are stacked upon each other, preferably at an angle to each other in adjacent layers and in a manner suitable for giving the requisite strength and the desired shape to the finished block product. In the manufacture of pulleys, gears, or the like, the glue-coated boards in adjacent layers may be set at right angles to each other, while for other products the angular arrangement may be different. After a pile of boards has been stacked in the aforesaid manner, it is subjected to an enormous pressure in order to compress the fibres of the wood into intimate contact with each other. This compression operation may be conveniently effected by the use of pressure rolls or hydraulic pressure.

In carrying out the compression of the pile of boards in a hydraulic press, for example, a relatively small pressure is first applied and is maintained until the binder on the outer surfaces of the pile has assumed a condition where it will not be squirted out from between adjacent boards when the pressure is subsequently increased. After the binder has acquired a temporary set, as it were, the pressure is progressively increased until the desired enormous pressure has been reached. During the course of the aforesaid process, the outer surfaces of the pile may be subjected to artificial drying when desired. The product of these operations is a rigid composite block of compressed boards. This rigid composite block may then be fabricated in any suitable manner appropriate to the production of the desired article.

A fabricated article constituted of compressed composite lumber which has been prepared in accordance with my invention possesses a stability with respect to moisture that makes the article particularly adapted to use in relatively dry and/or relatively hot environments. In this way, articles can be produced in one geographical region and shipped to another where climatic conditions are entirely different, or the finished articles can be used is a variety of industrial operations or commercial situations under various external conditions without developing deleterious deterioration or distortion of the product.

In some instances it may be desirable to further modify the moisture content of the compressed composite material by further dehydration prior to or during the fabrication of the article, the essential condition being that in the fully fabricated article there shall be a lower percentage of moisture than the percentage of moisture in the environment where the article is to be used or through which it may be transported.

Instead of drying the wood to the sub-normal degree in the first stage of manufacture, this sub-normal drying step may be carried out after the compressed block is finished. In that case the wood constituting the block will as yet contain too much moisture which, when my invention is practised, will need to be removed before the final products are made from the material constituting the block.

I claim:

1. The process of producing compressed composite products which comprises preparing a multiplicity of units of material having a fibrous structure, surfacing said units with a bonding composition which is mobile at ordinary working temperatures and pressures whereby said composition partly flows or is drawn into the interior of the fibrous structure of the material, arranging said units in a stack with alternate layers set at an angle to each other so that the contacting surfaces of said units prior to compression of the stack make an adhesive connection with each other while part of the bonding composition is present in the interior of the fibrous material in the several uncompressed units, subjecting said as yet uncompressed stack in the aforesaid condition to an enormous pressure to compress the material of the stack and to bring the fibres of said material into close frictional contact with each other, maintaining pressure on said stack until the bonding composition has permanently set and the fibrous material has assumed a stable condition, and in correlation with at least one of said steps, reducing the moisture content of the material to such a degree that the resultant product will have a lower aggregate percentage of moisture than that which prevails in any environment wherein the product is normally adapted to be used.

2. The process of producing compressed composite products which comprises preparing a multiplicity of units of material having a fibrous structure, drying the said fibrous material to reduce the moisture content thereof to such a degree that even upon addition of moisture in subsequent stages of the process the resultant product will have a lower aggregate percentage of moisture than that which prevails in any environment wherein the product is normally adapted to be used, surfacing said units of fibrous material with a bonding composition which is mobile at ordinary working temperatures and pressures whereby said composition partly flows or is drawn into the interior of the fibrous structure of the material, arranging said units in a stack with alternate layers set at an angle to each other so that the contacting surfaces of said units prior to compression of the stack make an adhesive connection with each other while part of the bonding composition is present in the interior of the fibrous material in the several uncompressed units, subjecting said stack in the aforesaid condition to an enormous pressure to compress the material of the stack and to bring the fibres of said material into close frictional contact with each other, and maintaining pressure on said stack until the bonding composition has permanently set and the fibrous material has assumed a stable condition.

3. The process of producing compressed composite products which comprises preparing a multiplicity of units of material having a fibrous structure, drying the said fibrous material to reduce the moisture content thereof to such a degree that even upon addition of moisture in subsequent stages of the process the resultant product will have a lower aggregate percentage of moisture than that which prevails in any environment wherein the product is normally adapted to be used, surfacing said units of fibrous material with a freshly prepared aqueous casein glue which is mobile at ordinary working temperatures and pressures whereby said composition partly flows or is drawn into the interior of the fibrous structure of the material, arranging said units in a stack with alternate layers set at an angle to each other so that the contacting surfaces of said units prior to compression of the stack make an adhesive connection with each other while part of the bonding composition is present in the interior of the fibrous material in the several uncompressed units, applying a relatively small pressure to said stack until the casein glue on the outer surfaces of the stack has assumed a condition where it will not be squirted out from between adjacent units when the pressure is subsequently increased, then subjecting said stack in the aforesaid condition to an enormous pressure to compress the material of the stack and to bring the fibres of said material into close frictional contact with each other, and maintaining pressure on said stack until the bonding composition has permanently set and the fibrous material has assumed a stable condition.

4. In the art of producing composite laminated compressed products from lumber having a fibrous structure, the improvement which comprises reducing the lumber to a non-case-hardened subnormally dry condition having its moisture content reduced to a value within the range not greater than 2%, then applying to a surface of the thus dried lumber a bonding composition which is mobile at ordinary working temperatures and whose moisture content plus the residual moisture content still remaining in the wood after the operation first set forth is limited so as still to be lower than that which prevails in any environment in which the product is normally adapted to be used, affording an opportunity for said composition to find its way partially into the porous structure of the fibrous subnormally dry lumber, forming a stack of said lumber with adjacent surfaces bearing such bonding composition, applying size-reducing pressure to the stack and maintaining pressure on the stack until the bonding composition has acquired a permanent set.

In testimony whereof I have hereunto set my hand.

LAWRENCE J. OLLESHEIMER.